US012793459B2

(12) United States Patent
Smith

(10) Patent No.: US 12,793,459 B2
(45) Date of Patent: Nov. 10, 2026

(54) SYSTEM AND METHOD FOR ROUTING IMAGES OF INTERACTION REQUEST DOCUMENTS OF DIFFERENT TYPES

(71) Applicant: Bank of America Corporation, Charlotte, NC (US)

(72) Inventor: Michael Gregory Smith, Louisville, KY (US)

(73) Assignee: Bank of America Corporation, Charlotte, NC (US)

( * ) Notice: Subject to any disclaimer, the term of this patent is extended or adjusted under 35 U.S.C. 154(b) by 253 days.

(21) Appl. No.: 18/428,291

(22) Filed: Jan. 31, 2024

(65) Prior Publication Data

US 2025/0246016 A1 Jul. 31, 2025

(51) Int. Cl.
*G06V 30/41* (2022.01)
*G06T 5/50* (2006.01)

(52) U.S. Cl.
CPC ................ *G06V 30/41* (2022.01); *G06T 5/50* (2013.01)

(58) Field of Classification Search
None
See application file for complete search history.

(56) References Cited

U.S. PATENT DOCUMENTS 4,888,812 A * 12/1989 Dinan ................ H04N 1/32646 382/140
8,452,689 B1 * 5/2013 Medina, III ........... G06V 30/41 705/37
8,595,083 B2 11/2013 O'Leary et al.
8,626,661 B2 1/2014 Gilder
8,688,579 B1 * 4/2014 Ethington ............ G06V 30/414 705/42
8,705,836 B2 4/2014 Gorski et al.
8,798,354 B1 8/2014 Bunzel et al.
8,955,743 B1 2/2015 Block et al.
9,355,530 B1 5/2016 Block et al.
9,355,531 B2 5/2016 Graef et al.
9,779,392 B1 * 10/2017 Prasad ............... G06Q 20/0425
9,916,736 B2 3/2018 Block et al.
10,176,466 B2 1/2019 Block et al.
10,482,432 B1 11/2019 Oakes, III et al.

(Continued)

OTHER PUBLICATIONS

Gorski et al., "Industrial bank check processing: the A2iA CheckReader(TM)," IJDAR (2001) 3: 196-206 (Year: 2000).*

(Continued)

*Primary Examiner* — Soo Shin

(57) ABSTRACT

A method includes receiving a front side image and a back side image of an interaction request document from a user device of a user. The interaction request document corresponds to an interaction to be performed between the user and an interaction requestor. The front side image and the back side image are sent to a first image processing system and a second image processing system for processing. A first converted front side image and a first converted back side image are received from the first image processing system. A first notification is received from the second image processing system. The first notification indicates that processing of the front side image and the back side image failed. The first converted front side image and the first converted back side image are sent to an interaction processing system.

20 Claims, 3 Drawing Sheets

(56) References Cited

U.S. PATENT DOCUMENTS

| | | | | |
|---|---|---|---|---|
| 10,878,387 | B2 | 12/2020 | Weinflash | |
| 11,232,517 | B1 | 1/2022 | Medina et al. | |
| 11,488,405 | B1 | 11/2022 | Oakes, III et al. | |
| 12,175,438 | B1 * | 12/2024 | Franklin | G06N 20/00 |
| 12,488,606 | B2 * | 12/2025 | Franklin | G06V 30/15 |
| 2007/0156438 | A1 * | 7/2007 | Popadic | G06Q 40/00 229/71 |
| 2013/0297353 | A1 * | 11/2013 | Strange | G06Q 40/08 705/4 |
| 2019/0122222 | A1 | 4/2019 | Uechi | |
| 2019/0278986 | A1 * | 9/2019 | Nepomniachtchi | G06V 10/243 |
| 2023/0013039 | A1 | 1/2023 | Jurss | |
| 2025/0335886 | A1 * | 10/2025 | Franklin | G06Q 20/3223 |

OTHER PUBLICATIONS

Suen et al., "Sorting and Recognizing Cheques and Financial Documents" In: Lee, SW., Nakano, Y. (eds) Document Analysis Systems: Theory and Practice. DAS 1998. Lecture Notes in Computer Science, vol. 1655. Springer, Berlin, Heidelberg. https://doi.org/10.1007/3-540-48172-9_15 (Year: 1999).*

* cited by examiner

SYSTEM AND METHOD FOR ROUTING IMAGES OF INTERACTION REQUEST DOCUMENTS OF DIFFERENT TYPES

TECHNICAL FIELD

The present disclosure relates generally to processing of interaction request documents, and more specifically to a system and method for routing images of interaction request documents of different types.

BACKGROUND

Generally, a user may receive various interaction request documents of different types. However, the user may be able to process interaction request documents of a particular type. Before processing an interaction request document, a type of the interaction request document is identified so that images of the interaction request document are routed to a respective image processing system.

SUMMARY

The system described in the present disclosure provides several practical applications and technical advantages that overcome the current technical problems with processing of interaction request documents.

In general, the system includes an interceptor system that is operably coupled to one or more user devices of one or more users, a mobile application server, an interaction processing system, a first image processing system, and a second image processing system via a network. In operation, the user device of the user captures a front side image and a back side image of an interaction request document. In some embodiments, the interaction request document may be of a first type. In other embodiments, the interaction request document may be of a second type different from the first type. The interceptor system receives the front side image and the back side image from the interaction processing system. In such embodiments, the user device sends the front side image and the back side image to the mobile application server, which forwards the front side image and the back side image to the interaction processing system.

The interceptor system sends the front side image and the back side image to the first image processing system and the second image processing system. In certain embodiments, the interceptor system sends the front side image and the back side image to the first image processing system and the second image processing system at the same time. The first image processing system processes the front side image and the back side image to generate a first converted front side image and a first converted back side image, respectively. The second image processing system processes the front side image and the back side image to generate a second converted front side image and a second converted back side image, respectively. The first image processing system determines whether the first converted front side image and the first converted back side image are successfully generated. In response to determining that the first converted front side image and the first converted back side image are not successfully generated, the interceptor system receives a first notification from the first image processing system. The first notification indicates that processing of the front side image and the back side image failed.

The second image processing system determines whether the second converted front side image and the second converted back side image are successfully generated. In response to determining that the second converted front side image and the second converted back side image are not successfully generated, the interceptor system receives a second notification from the second image processing system. The second notification indicates that processing of the front side image and the back side image failed. The interceptor system sends the first notification or the second notification to the interaction processing system. The interaction processing system generates a third notification, which indicates that an interaction corresponding to the interaction request document failed. The interaction processing system sends the third notification to the mobile application server, which forwards the third notification to the user device.

In response to determining that the first converted front side image and the first converted back side image are successfully generated, the second image processing system determines whether the second converted front side image and the second converted back side image are successfully generated. In response to determining that the second converted front side image and the second converted back side image are not successfully generated, the interceptor system receives a notification from the second image processing system. The notification indicates that processing of the front side image and the back side image failed.

The interceptor system receives the first converted front side image and the first converted back side image from the first image processing system and sends the first converted front side image and the first converted back side image to the interaction processing system. The interaction processing system performs an interaction corresponding to the interaction request document based on the first converted front side image and the first converted back side image. In certain embodiments when the interaction request document is a check, the interaction processing system deposits requested funds to a user account number of the user from a requestor account number. The interaction processing system generates a notification, which indicates that the interaction corresponding to the interaction request document succeeded. The interaction processing system sends the notification to the mobile application server, which forwards the notification to the user device.

In response to determining that the second converted front side image and the second converted back side image are successfully generated, the interceptor system receives the second converted front side image and the second converted back side image from the second image processing system and sends the second converted front side image and the second converted back side image to the interaction processing system. The interaction processing system performs an interaction corresponding to the interaction request document based on the second converted front side image and the second converted back side image. In certain embodiments when the interaction request document is a check, the interaction processing system deposits requested funds to the user account number of the user from the requestor account number. The interaction processing system generates a notification, which indicates that the interaction corresponding to the interaction request document succeeded. The interaction processing system sends the notification to the mobile application server, which forwards the notification to the user device.

The present disclosure provides various advantages. The disclosed system allows for routing images of interaction request documents without identifying types of the interaction request documents and provides converted images to an interaction processing system for further processing. By allowing the processing of interaction request documents of different types by a same system, computing resources (e.g., memory, network bandwidth, etc.) that would otherwise be used to process interaction request documents by separate systems based on the types of the interaction request documents may be saved and used for other purposes. Accordingly, the following disclosure is particularly integrated into practical applications of: (1) routing images of interaction request documents without identifying types of the interaction request documents; and (2) improving the utilization of computing resources while processing interaction request documents of different types.

In one embodiment, a system includes an interceptor system communicatively coupled to an interaction processing system, a first image processing system and a second image processing system. The first image processing system is configured to process images of interaction request documents of a first type. The second image processing system is configured to process images of interaction request documents of a second type. The interceptor system includes a processor. The processor is configured to receive a first front side image and a first back side image of a first interaction request document from a user device of a user. The first interaction request document corresponds to a first interaction to be performed between the user and a first interaction requestor. The first interaction request document is of the first type. The processor is further configured to send the first front side image and the first back side image to the first image processing system and the second image processing system for processing, receive a first converted front side image and a first converted back side image from the first image processing system, and receive a first notification from the second image processing system. The first notification indicates that processing of the first front side image and the first back side image failed. The processor is further configured to send the first converted front side image and the first converted back side image to the interaction processing system.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, where like reference numerals represent like parts.

DETAILED DESCRIPTION

Figure 1:
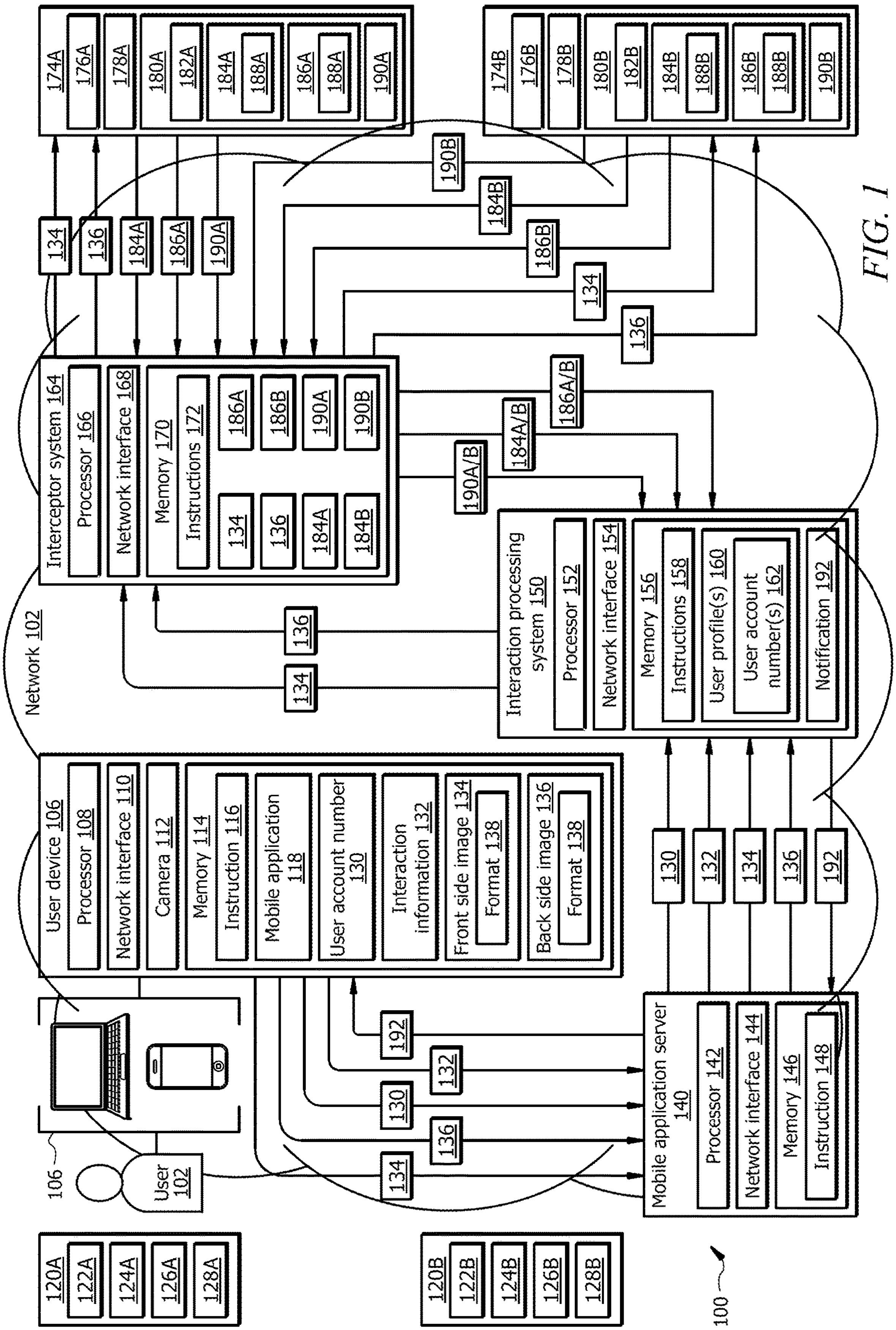
FIG. 1 illustrates an embodiment of a system configured for routing images of interaction request documents of different types.
Figure 2A:
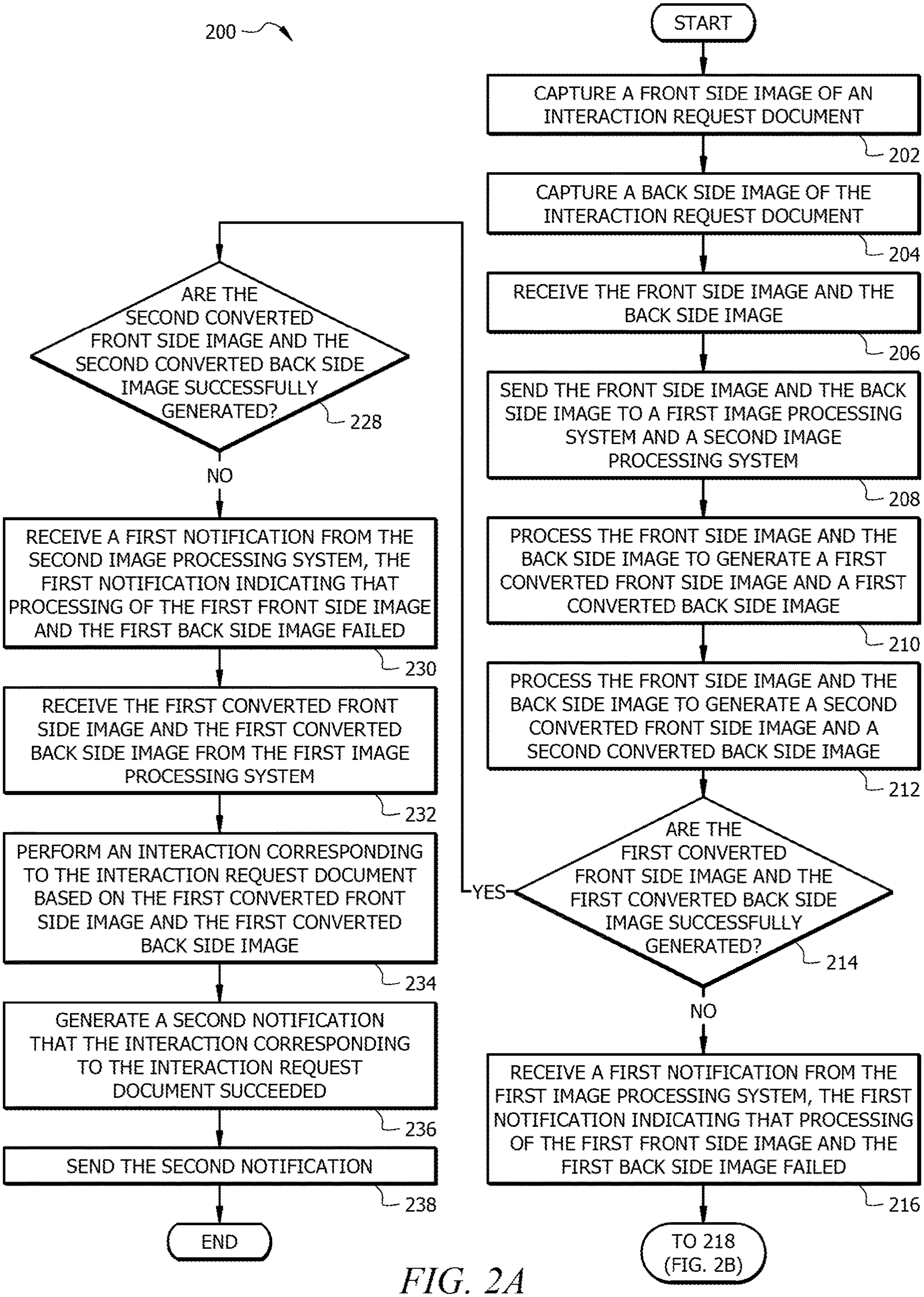
FIGS. 2A and 2B illustrate an example operational flow of system of FIG. 1 for routing images of interaction request documents of different types.
Figure 2B:
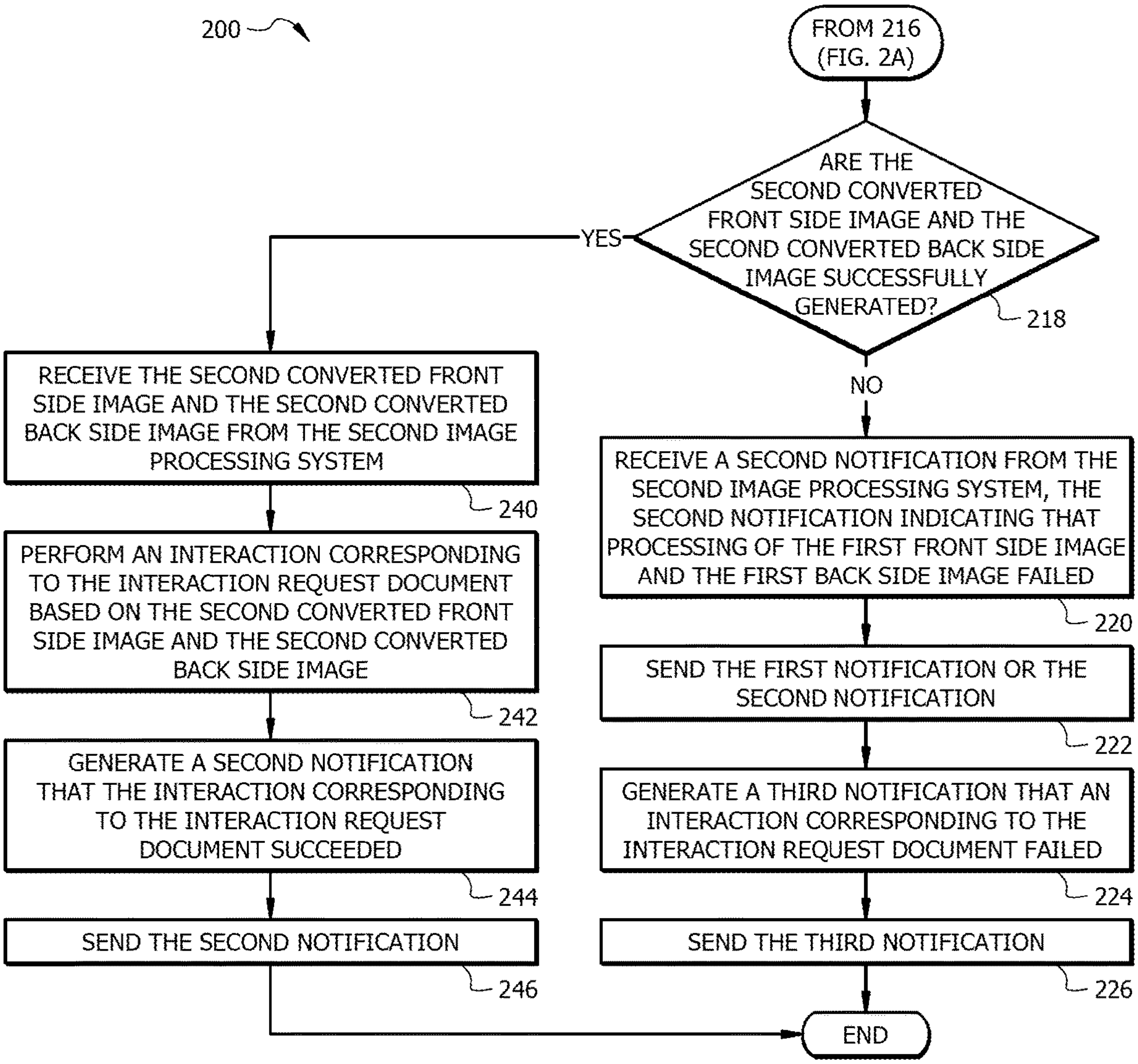

As described above, previous technologies fail to provide effective solutions for processing of interaction request documents. Embodiments of the present disclosure and its advantages may be understood by referring to FIGS. 1, 2A, and 2B. FIGS. 1, 2A, and 2B are used to describe a system and method for routing images of interaction request documents of different types.

System Overview

FIG. 1 illustrates an embodiment of a system 100 that is generally configured for routing images of interaction request documents of different types. In certain embodiments, the system 100 comprises an interceptor system 164 that is operably coupled to one or more user devices (e.g., user device 106) of one or more users (e.g., user 104), a mobile application server 140, an interaction processing system 150, a first image processing system 174A, and a second image processing system 174B via a network 102. Network 102 enables the communication between the components of the system 100. In other embodiments, system 100 may not have all the components listed and/or may have other elements instead of, or in addition to, those listed above.

In general, the user device 106 of the user 104 captures a front side image 134 and a back side image 136 of an interaction request document (e.g., interaction request document 120A or 120B). In some embodiments, the interaction request document (e.g., interaction request document 120A) may be of a first type. The first type may be a first geographical region such as the USA. In some embodiments, the interaction request document (e.g., interaction request document 120B) may be of a second type. The second type may be a second geographical region such as Canada. In certain embodiments, each of the interaction request documents 120A and 120B may be a check such as a personal check, a cashier's check, a traveler's check, or the like. The interceptor system 164 receives the front side image 134 and the back side image 136. In certain embodiments, the interceptor system 164 receives the front side image 134 and the back side image 136 from the interaction processing system 150. In such embodiments, the user device 106 sends the front side image 134 and the back side image 136 to the mobile application server 140, which forwards the front side image 134 and the back side image 136 to the interaction processing system 150.

The interceptor system 164 sends the front side image 134 and the back side image 136 to the first image processing system 174A and the second image processing system 174B. In certain embodiments, the interceptor system 164 sends the front side image 134 and the back side image 136 to the first image processing system 174A and the second image processing system 174B at the same time. The first image processing system 174A processes the front side image 134 and the back side image 136 to generate a first converted front side image 184A and a first converted back side image 186A, respectively. The second image processing system 174B processes the front side image 134 and the back side image 136 to generate a second converted front side image 184B and a second converted back side image 186B, respectively. The first image processing system 174A determines whether the first converted front side image 184A and the first converted back side image 186A are successfully generated. In response to determining that the first converted front side image 184A and the first converted back side image 186A are not successfully generated, the interceptor system 164 receives a notification 190A from the first image processing system 174A. The notification 190A indicates that processing of the front side image 134 and the back side image 136 failed.

The second image processing system 174B determines whether the second converted front side image 184B and the second converted back side image 186B are successfully generated. In response to determining that the second converted front side image 184B and the second converted back side image 186B are not successfully generated, the interceptor system 164 receives a notification 190B from the second image processing system 174B. The notification 190B indicates that processing of the front side image 134 and the back side image 136 failed. The interceptor system 164 sends the notification 190A or the notification 190B to the interaction processing system 150. The interaction processing system 150 generates a notification 192, which indicates that an interaction corresponding to the interaction request document (e.g., interaction request document 120A or 120B) failed. The interaction processing system 150 sends the notification 192 to the mobile application server 140, which forwards the notification 192 to the user device 106.

In response to determining that the first converted front side image 184A and the first converted back side image 186A are successfully generated, the second image processing system 174B determines whether the second converted front side image 184B and the second converted back side image 186B are successfully generated. In response to determining that the second converted front side image 184B and the second converted back side image 186B are not successfully generated, the interceptor system 164 receives a notification 190B from the second image processing system 174B. The notification 190B indicates that processing of the front side image 134 and the back side image 136 failed.

The interceptor system 164 receives the first converted front side image 184A and the first converted back side image 186A from the first image processing system 174A and sends the first converted front side image 184A and the first converted back side image 186A to the interaction processing system 150. The interaction processing system 150 performs an interaction corresponding to the interaction request document (e.g., interaction request document 120A or 120B) based on the first converted front side image 184A and the first converted back side image 186A. In certain embodiments when the interaction request document (e.g., interaction request document 120A or 120B) is a check, the interaction processing system 150 deposits requested funds to a user account number 130 of the user 104 from a requestor account number. The interaction processing system 150 generates a notification 192, which indicates that the interaction corresponding to the interaction request document (e.g., interaction request document 120A or 120B) succeeded. The interaction processing system 150 sends the notification 192 to the mobile application server 140, which forwards the notification 192 to the user device 106.

In response to determining that the second converted front side image 184B and the second converted back side image 186B are successfully generated, the interceptor system 164 receives the second converted front side image 184B and the second converted back side image 186B from the second image processing system 174B and sends the second converted front side image 184B and the second converted back side image 186B to the interaction processing system 150. The interaction processing system 150 performs an interaction corresponding to the interaction request document (e.g., interaction request document 120A or 120B) based on the second converted front side image 184B and the second converted back side image 186B. In certain embodiments when the interaction request document (e.g., interaction request document 120A or 120B) is a check, the interaction processing system 150 deposits requested funds to the user account number 130 of the user 104 from the requestor account number. The interaction processing system 150 generates a notification 192, which indicates that the interaction corresponding to the interaction request document (e.g., interaction request document 120A or 120B) succeeded. The interaction processing system 150 sends the notification 192 to the mobile application server 140, which forwards the notification 192 to the user device 106.

System Components

Network

Network 102 may be any suitable type of wireless and/or wired network. Network 102 may or may not be connected to the Internet or public network. Network 102 may include all or a portion of an Intranet, a peer-to-peer network, a switched telephone network, a local area network (LAN), a wide area network (WAN), a metropolitan area network (MAN), a personal area network (PAN), a wireless PAN (WPAN), an overlay network, a software-defined network (SDN), a virtual private network (VPN), a mobile telephone network (e.g., cellular networks, such as 4G or 5G), a plain old telephone (POT) network, a wireless data network (e.g., WiFi, WiGig, WiMax, etc.), a long-term evolution (LTE) network, a universal mobile telecommunications system (UMTS) network, a peer-to-peer (P2P) network, a Bluetooth network, a near field communication (NFC) network, and/or any other suitable network. Network 102 may be configured to support any suitable type of communication protocol as would be appreciated by one of ordinary skill in the art.

User Device

The user device 106 is generally any computing device that is configured to process data and interact with the user 104. Examples of the user device 106 include, but are not limited to, a personal computer, a desktop computer, a workstation, a server, a laptop, a tablet computer, a mobile phone (such as a smartphone), a virtual reality headset, etc. The user device 106 may include a user interface, such as a display, a microphone, a keypad, a camera 112, or other appropriate terminal equipment usable by the user 104.

The user device 106 further comprises a processor 108 in signal communication with a memory 114 and a network interface 110. Processor 108 may comprise one or more processors operably coupled to the memory 114. Processor 108 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). Processor 108 may be a programmable logic device, a microcontroller, a microprocessor, or any suitable combination of the preceding. The one or more processors are configured to process data and may be implemented in hardware or software. For example, processor 108 may be 8-bit, 16-bit, 32-bit, 64-bit, or of any other suitable architecture. Processor 108 is configured to implement various software instructions. For example, processor 108 is configured to execute software instructions 116 and a mobile application 118 that are stored in the memory 114 in order to perform the operations described herein.

Network interface 110 is configured to enable wired and/or wireless communications (e.g., via network 102). Network interface 110 is configured to communicate data between the user device 106 and other components of the system 100. For example, network interface 110 may comprise a WIFI interface, a local area network (LAN) interface, a wide area network (WAN) interface, a modem, a switch, or a router. Network interface 110 may be configured to use any suitable type of communication protocol as would be appreciated by one of ordinary skill in the art.

Memory 114 comprises a non-transitory computer-readable medium such as one or more disks, tape drives, or solid-state drives, and may be used as an over-flow data storage device, to store programs when such programs are selected for execution, and to store instructions and data that are read during program execution. Memory 114 may be volatile or non-volatile and may comprise a read-only memory (ROM), random-access memory (RAM), ternary content-addressable memory (TCAM), dynamic random-access memory (DRAM), and static random-access memory (SRAM). Memories 114 may be implemented using one or more disks, tape drives, solid-state drives, and/or the like. Memory 114 may store any of the information described in FIGS. 1, 2A, and 2B along with any other data, instructions, logic, rules, or code operable to implement the function(s) described herein. Memory 114 is operable to store software instructions 116, mobile application 118, and/or any other data and instructions. Software instructions 116 and mobile application 118 may comprise any suitable set of software instructions, logic, rules, or code operable to be executed by processor 108.

The user 104 may receive a plurality of interaction requests documents (e.g., interaction request documents 120A and 120B) from one or more requestors. The interaction request documents may be of different types. In the illustrated embodiment, the interaction request document 120A is of a first type and the interaction request document 120B is of a second type. The first type may be a first geographical region such as the USA. The second type may be a second geographical region such as Canada. The interaction request document 120A/B may comprise user information 122A/B, interaction requestor information 124A/B, interaction information 126A/B, and interaction requestor account information 128A/B. In certain embodiments, each of the interaction request documents 120A and 120B may be a check such as a personal check, a cashier's check, a traveler's check, or the like. In such embodiments, the user information 122A/B may comprise a name and an address of the user 104, the interaction requestor information 124A/B may comprise a name and an address of a requestor, the interaction information 126A/B may comprise an amount of funds to be transferred to the user 104 from the requestor, and the interaction requestor account information 128A/B may comprise a bank routing number and an account number of the requestor. The interaction requestor account information 128A and the interaction requestor account information 128B may have different formats depending on the types of the interaction request documents 120A and 120B. In one embodiment, the user 104 may be an individual such that interaction request documents (e.g., interaction request documents 120A and 120B) are addressed personally to the user 104. In another embodiment, the user 104 may be an individual who is authorized to process interaction request documents (e.g., interaction request documents 120A and 120B) that are addressed to an entity. The entity may be a company, an organization, a business, or the like.

In operation, the processor 108 of the user device 106 of the user 104 captures a front side image 134 and a back side image 136 of an interaction request document (e.g., interaction request document 120A or 120B). In certain embodiments, the processor 108 of the user device 106 may instruct the camera 112 of the user device 106 to capture the front side image 134 and the back side image 136 of the interaction request document (e.g., interaction request document 120A or 120B). The front side image 134 and back side image 136 are color images having a format 138. In certain embodiments, the format 138 may be a 32-bit color jpeg, or other image formats suitable for color images.

In certain embodiments, before or after capturing the front side image 134 and the back side image 136 of the interaction request document (e.g., interaction request document 120A or 120B), the user 104 may select a user account number 130 and enter interaction information 132 into the user device 106. The interaction information 132 may be based upon the interaction information (e.g., interaction information 126A or 126B) that the user 104 may read from the interaction request document (e.g., interaction request document 120A or 120B). The processor 108 of the user device 106 sends the front side image 134, the back side image 136, the user account number 130, and the interaction information 132 to the mobile application server 140, which forwards the front side image 134, the back side image 136, the user account number 130, and the interaction information 132 to the interaction processing system 150. As described below in greater detail, the front side image 134, the back side image 136, the user account number 130, and the interaction information 132 are used by the interaction processing system 150 to perform an interaction corresponding to the interaction request document (e.g., interaction request document 120A or 120B). In certain embodiments when the interaction request document (e.g., interaction request document 120A or 120B) comprises a check, the interaction comprises a check deposition process. In certain embodiments, the operations discussed above may be performed by the processor 108 of the user device 106 while executing the mobile application 118.

Mobile Application Server

Mobile application server 140 is generally any computing device that is configured to process data and communicate with other components of the system 100 via the network 102. Mobile application server 140 may comprise a processor 142 in signal communication with a memory 146 and a network interface 144.

Processor 142 comprises one or more processors operably coupled to the memory 146. Processor 142 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). Processor 142 may be a programmable logic device, a microcontroller, a microprocessor, or any suitable combination of the preceding. The one or more processors are configured to process data and may be implemented in hardware or software. Processor 142 may be 8-bit, 16-bit, 32-bit, 64-bit, or of any other suitable architecture. The one or more processors are configured to implement various software instructions to perform the operations described herein. For example, the one or more processors are configured to execute software instructions 148 to perform one or more functions of the mobile application server 140 described herein.

Network interface 144 is configured to enable wired and/or wireless communications (e.g., via network 102). Network interface 144 is configured to communicate data between the mobile application server 140 and other components of the system 100. For example, network interface 144 may comprise a WIFI interface, a local area network (LAN) interface, a wide area network (WAN) interface, a modem, a switch, or a router. Processor 142 is configured to send and receive data using the network interface 144. Network interface 144 may be configured to use any suitable type of communication protocol as would be appreciated by one of ordinary skill in the art.

Memory 146 comprises a non-transitory computer-readable medium such as one or more disks, tape drives, or solid-state drives, and may be used as an over-flow data storage device, to store programs when such programs are selected for execution, and to store instructions and data that are read during program execution. Memory 146 may be volatile or non-volatile and may comprise a read-only memory (ROM), random-access memory (RAM), ternary content-addressable memory (TCAM), dynamic random-access memory (DRAM), and static random-access memory (SRAM). Memory 146 may be implemented using one or more disks, tape drives, solid-state drives, and/or the like. Memory 146 may store any of the information described in FIGS. 1, 2A, and 2B along with any other data, instructions, logic, rules, or code operable to implement the function(s) described herein. Memory 146 is operable to store software instructions 148 and/or any other data and instructions. Software instructions 148 may comprise any suitable set of software instructions, logic, rules, or code operable to be executed by processor 142.

Mobile application server 140 may be configured to provide data to the user device 106 when executing the mobile application 118. In operation, the processor 142 of the mobile application server 140 is configured to receive various data items (e.g., front side image 134, back side image 136, user account number 130, and interaction information 132) from the user device 106 and forward them to the interaction processing system 150. The processor 142 of the mobile application server 140 is further configured to receive various data items (e.g., notification 192) from the interaction processing system 150 and forward them to user device 106.

Interaction Processing System

Interaction processing system 150 is generally any computing device that is configured to process data and communicate with other components of the system 100 via the network 102. Interaction processing system 150 may comprise a processor 152 in signal communication with a memory 156 and a network interface 154.

Processor 152 comprises one or more processors operably coupled to the memory 156. Processor 152 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). Processor 152 may be a programmable logic device, a microcontroller, a microprocessor, or any suitable combination of the preceding. The one or more processors are configured to process data and may be implemented in hardware or software. Processor 152 may be 8-bit, 16-bit, 32-bit, 64-bit, or of any other suitable architecture. The one or more processors are configured to implement various software instructions to perform the operations described herein. For example, the one or more processors are configured to execute software instructions 158 to perform one or more functions of the interaction processing system 150 described herein.

Network interface 154 is configured to enable wired and/or wireless communications (e.g., via network 102). Network interface 154 is configured to communicate data between the interaction processing system 150 and other components of the system 100. For example, network interface 154 may comprise a WIFI interface, a local area network (LAN) interface, a wide area network (WAN) interface, a modem, a switch, or a router. Processor 152 is configured to send and receive data using the network interface 154. Network interface 154 may be configured to use any suitable type of communication protocol as would be appreciated by one of ordinary skill in the art.

Memory 156 comprises a non-transitory computer-readable medium such as one or more disks, tape drives, or solid-state drives, and may be used as an over-flow data storage device, to store programs when such programs are selected for execution, and to store instructions and data that are read during program execution. Memory 156 may be volatile or non-volatile and may comprise a read-only memory (ROM), random-access memory (RAM), ternary content-addressable memory (TCAM), dynamic random-access memory (DRAM), and static random-access memory (SRAM). Memory 156 may be implemented using one or more disks, tape drives, solid-state drives, and/or the like. Memory 156 may store any of the information described in FIGS. 1, 2A, and 2B along with any other data, instructions, logic, rules, or code operable to implement the function(s) described herein. Memory 156 is operable to store software instructions 158 and/or any other data and instructions. Software instructions 158 may comprise any suitable set of software instructions, logic, rules, or code operable to be executed by processor 152. Memory 156 may further store one or more user profiles 160 of the one or more users (e.g., user 104). Each of the one or more user profiles 160 comprises one or more account numbers 162 of a respective user (e.g., user 104).

Interaction processing system 150 is configured to perform interactions corresponding to interaction request documents (e.g., interaction request documents 120A or 120B). In operation, the processor 152 of the interaction processing system 150 receives the user account number 130, the interaction information 132, the front side image 134, and the back side image 136 from the mobile application server 140 and sends the front side image 134 and the back side image 136 to the interceptor system 164.

In some embodiments, the processor 152 of the interaction processing system 150 may receive the first converted front side image 184A and the first converted back side image 186A from the interceptor system 164. In such embodiments, the processor 152 of the interaction processing system 150 performs an interaction corresponding to the interaction request document 120A based on the user account number 130, the interaction information 132, the first converted front side image 184A and the first converted back side image 186A. The processor 152 of the interaction processing system 150 extracts the user information 122A, the interaction requestor information 124A, the interaction information 126A, and the interaction requestor account information 128A from the first converted front side image 184A and the first converted back side image 186A. In certain embodiments, when the interaction request document 120A is a check, the processor 152 of the interaction processing system 150 deposits requested funds to the user account number 130 of the user 104 from a requestor account.

In other embodiments, the processor 152 of the interaction processing system 150 may receive the second converted front side image 184B and the second converted back side image 186B from the interceptor system 164. In such embodiments, the processor 152 of the interaction processing system 150 performs an interaction corresponding to the interaction request document 120B based on the user account number 130, the interaction information 132, the second converted front side image 184B and the second converted back side image 186B. The processor 152 of the interaction processing system 150 extracts the user information 122B, the interaction requestor information 124B, the interaction information 126B, and the interaction requestor account information 128B from the second converted front side image 184B and the second converted back side image 186B. In certain embodiments, when the interaction request document 120B is a check, the processor 152 of the interaction processing system 150 deposits requested funds to the user account number 130 of the user 104 from a requestor account.

In yet other embodiments, the processor 152 of the interaction processing system 150 may receive a notification (e.g., notification 190A or 190B) from the interceptor system 164. The notification may indicate that processing of the front side image 134 and the back side image 136 failed. The processor 152 of the interaction processing system 150 generates a notification 192, which indicates that an interaction corresponding to the interaction request document (e.g., interaction request document 120A or 120B) failed. The processor 152 of the interaction processing system 150 sends the notification 192 to the mobile application server 140, which forwards the notification 192 to the user device 106.

Interceptor System

Interceptor system 164 is generally any computing device that is configured to process data and communicate with other components of the system 100 via the network 102. Interceptor system 164 may comprise a processor 166 in signal communication with a memory 170 and a network interface 168.

Processor 166 comprises one or more processors operably coupled to the memory 170. Processor 166 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). Processor 166 may be a programmable logic device, a microcontroller, a microprocessor, or any suitable combination of the preceding. The one or more processors are configured to process data and may be implemented in hardware or software. Processor 166 may be 8-bit, 16-bit, 32-bit, 64-bit, or of any other suitable architecture. The one or more processors are configured to implement various software instructions to perform the operations described herein. For example, the one or more processors are configured to execute software instructions 172 to perform one or more functions of the interceptor system 164 described herein.

Network interface 168 is configured to enable wired and/or wireless communications (e.g., via network 102). Network interface 168 is configured to communicate data between the interceptor system 164 and other components of the system 100. For example, network interface 168 may comprise a WIFI interface, a local area network (LAN) interface, a wide area network (WAN) interface, a modem, a switch, or a router. Processor 166 is configured to send and receive data using the network interface 168. Network interface 168 may be configured to use any suitable type of communication protocol as would be appreciated by one of ordinary skill in the art.

Memory 170 comprises a non-transitory computer-readable medium such as one or more disks, tape drives, or solid-state drives, and may be used as an over-flow data storage device, to store programs when such programs are selected for execution, and to store instructions and data that are read during program execution. Memory 170 may be volatile or non-volatile and may comprise a read-only memory (ROM), random-access memory (RAM), ternary content-addressable memory (TCAM), dynamic random-access memory (DRAM), and static random-access memory (SRAM). Memory 170 may be implemented using one or more disks, tape drives, solid-state drives, and/or the like. Memory 170 may store any of the information described in FIGS. 1, 2A, and 2B along with any other data, instructions, logic, rules, or code operable to implement the function(s) described herein. Memory 170 is operable to store software instructions 172 and/or any other data and instructions. Software instructions 172 may comprise any suitable set of software instructions, logic, rules, or code operable to be executed by processor 166.

In operation, the processor 166 of the interceptor system 164 receives a front side image 134 and a back side image 136 of an interaction request document (e.g., interaction request document 120A or 120B) from the interaction processing system 150. The processor 166 of the interceptor system 164 sends the front side image 134 and the back side image 136 to a first image processing system 174A and a second image processing system 174B. In certain embodiments, the processor 166 of the interceptor system 164 sends the front side image 134 and the back side image 136 to the first image processing system 174A and the second image processing system 174B at the same time.

In some embodiments, the processor 166 of the interceptor system 164 receives a first converted front side image 184A and a first converted back side image 186A from the first image processing system 174A and sends the first converted front side image 184A and the first converted back side image 186A to the interaction processing system 150. The processor 166 of the interceptor system 164 receives a notification 190B from the second image processing system 174B. The notification 190B indicates that processing of the front side image 134 and the back side image 136 failed.

In other embodiments, the processor 166 of the interceptor system 164 receives a second converted front side image 184B and a second converted back side image 186B from the second image processing system 174B and sends the second converted front side image 184B and the second converted back side image 186B to the interaction processing system 150. The processor 166 of the interceptor system 164 receives a notification 190A from the first image processing system 174A. The notification 190A indicates that processing of the front side image 134 and the back side image 136 failed.

In yet other embodiments, the processor 166 of the interceptor system 164 receives a notification 190A from the first image processing system 174A or a notification 190B from the second image processing system 174B. Each of the notifications 190A and 190B indicates that processing of the front side image 134 and the back side image 136 failed.

First Image Processing System

First image processing system 174A is generally any computing device that is configured to process data and communicate with other components of the system 100 via the network 102. First image processing system 174A may comprise a processor 176A in signal communication with a memory 180A and a network interface 178A.

Processor 176A comprises one or more processors operably coupled to the memory 180A. Processor 176A is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). Processor 176A may be a programmable logic device, a microcontroller, a microprocessor, or any suitable combination of the preceding. The one or more processors are configured to process data and may be implemented in hardware or software. Processor 176A may be 8-bit, 16-bit, 32-bit, 64-bit, or of any other suitable architecture. The one or more processors are configured to implement various software instructions to perform the operations described herein. For example, the one or more processors are configured to execute software instructions 182A to perform one or more functions of the first image processing system 174A described herein.

Network interface 178A is configured to enable wired and/or wireless communications (e.g., via network 102). Network interface 178A is configured to communicate data between the first image processing system 174A and other components of the system 100. For example, the network interface 178A may comprise a WIFI interface, a local area network (LAN) interface, a wide area network (WAN) interface, a modem, a switch, or a router. Processor 176A is configured to send and receive data using the network interface 178A. Network interface 178A may be configured to use any suitable type of communication protocol as would be appreciated by one of ordinary skill in the art.

Memory 180A comprises a non-transitory computer-readable medium such as one or more disks, tape drives, or solid-state drives, and may be used as an over-flow data storage device, to store programs when such programs are selected for execution, and to store instructions and data that are read during program execution. Memory 180A may be volatile or non-volatile and may comprise a read-only memory (ROM), random-access memory (RAM), ternary content-addressable memory (TCAM), dynamic random-access memory (DRAM), and static random-access memory (SRAM). Memory 180A may be implemented using one or more disks, tape drives, solid-state drives, and/or the like. Memory 180A may store any of the information described in FIGS. 1, 2A, and 2B along with any other data, instructions, logic, rules, or code operable to implement the function(s) described herein. Memory 180A is operable to store software instructions 182A and/or any other data and instructions. Software instructions 182A may comprise any suitable set of software instructions, logic, rules, or code operable to be executed by processor 176A.

The first image processing system 174A is configured to process images of interaction request documents of the first type. In operation, the processor 176A of the first image processing system 174A receives the front side image 134 and the back side image 136 from the interceptor system 164 and processes the front side image 134 and the back side image 136. In certain embodiments when the front side image 134 and the back side image 136 correspond to the interaction request document 120A, the first image processing system 174A processes the front side image 134 and the back side image 136 to generate a first converted front side image 184A and a first converted back side image 186A, respectively. The first converted front side image 184A and the first converted back side image 186A are black and white images having a format 188A. In certain embodiments, the format 188A may be a 16-bit black and white tiff, or other image formats suitable for black and white images. The processor 176A of the first image processing system 174A sends the first converted front side image 184A and the first converted back side image 186A to the interceptor system 164. In certain embodiments when the front side image 134 and the back side image 136 correspond to the interaction request document 120B, processing of the front side image 134 and the back side image 136 fails. In such embodiments, the processor 176A of the first image processing system 174A generates a notification 190A, which indicates that processing of the front side image 134 and the back side image 136 failed. The processor 176A of the first image processing system 174A sends the notification 190A to the interceptor system 164.

Second Image Processing System

Second image processing system 174B is generally any computing device that is configured to process data and communicate with other components of the system 100 via the network 102. Second image processing system 174B may comprise a processor 176B in signal communication with a memory 180B and a network interface 178B.

Processor 176B may be similar to processor 176A and the description is not repeated herein. Processor 176B is configured to execute software instructions 182B to perform one or more functions of the second image processing system 174B described herein. Network interface 178B is configured to enable wired and/or wireless communications (e.g., via network 102). Network interface 178B is configured to communicate data between the second image processing system 174B and other components of the system 100. Network interface 178B may be similar to network interface 178A and the description is not repeated herein.

Memory 180B comprises a non-transitory computer-readable medium such as one or more disks, tape drives, or solid-state drives, and may be used as an over-flow data storage device, to store programs when such programs are selected for execution, and to store instructions and data that are read during program execution. Memory 180B may be similar to memory 180A and the description is not repeated herein. Memory 180B may store any of the information described in FIGS. 1, 2A, and 2B along with any other data, instructions, logic, rules, or code operable to implement the function(s) described herein. Memory 180B is operable to store software instructions 182B and/or any other data and instructions. Software instructions 182B may comprise any suitable set of software instructions, logic, rules, or code operable to be executed by processor 176B.

The second image processing system 174B is configured to process images of interaction request documents of the second type. In operation, the processor 176B of the second image processing system 174B receives the front side image 134 and the back side image 136 from the interceptor system 164 and processes the front side image 134 and the back side image 136. In certain embodiments when the front side image 134 and the back side image 136 correspond to the interaction request document 120B, the second image processing system 174B processes the front side image 134 and the back side image 136 to generate a second converted front side image 184B and a second converted back side image 186B, respectively. The second converted front side image 184B and the second converted back side image 186B are black and white images having a format 188B. In certain embodiments, the format 188B may be a 16-bit black and white tiff, or other image formats suitable for black and white images. The processor 176B of the second image processing system 174B sends the second converted front side image 184B and the second converted back side image 186B to the interceptor system 164. In certain embodiments when the front side image 134 and the back side image 136 correspond to the interaction request document 120A, processing of the front side image 134 and the back side image 136 fails. In such embodiments, the processor 176B of the second image processing system 174B generates a notification 190B, which indicates that processing of the front side image 134 and the back side image 136 failed. The processor 176B of the second image processing system 174B sends the notification 190B to the interceptor system 164.

Example Method for Password Expiration Management

FIGS. 2A and 2B illustrate an example flowchart of a method 200 for routing images of interaction request documents of different types. Modifications, additions, or omissions may be made to method 200. Method 200 may include more, fewer, or other operations. For example, operations may be performed in parallel or in any suitable order. For example, one or more operations of method 200 may be implemented, at least in part, in the form of the software instructions (e.g., software instructions 116, 148, 158, 172, 182A and/or 182B of FIG. 1), stored on non-transitory, tangible, machine-readable medium (e.g., memories 114, 146, 156, 170, 180A and/or 180B of FIG. 1) that when executed by one or more processors (e.g., processors 108, 142, 152, 166, 176A and/or 176B of FIG. 1) may cause the one or more processors to perform operations 202-246.

Method 200 starts with operation 202, where a processor 108 of a user device 106 of a user 104 captures a front side image 134 of an interaction request document (e.g., interaction request document 120A or 120B of FIG. 1). In some embodiments, the interaction request document (e.g., interaction request document 120A of FIG. 1) may be of a first type. The first type may be a first geographical region such as the USA. In some embodiments, the interaction request document (e.g., interaction request document 120B of FIG. 1) may be of a second type. The second type may be a second geographical region such as Canada. In certain embodiments, the processor 108 of the user device 106 may instruct a camera 112 of the user device 106 to capture the front side image 134 of the interaction request document (e.g., interaction request document 120A or 120B of FIG. 1). The front side image 134 is a color image having a format 138. In certain embodiments, the format 138 may be a 32-bit color jpeg, or other image formats suitable for color images. At operation 204, the processor 108 of the user device 106 captures a back side image 136 of the interaction request document (e.g., interaction request document 120A or 120B of FIG. 1). In certain embodiments, the processor 108 of the user device 106 may instruct the camera 112 of the user device 106 to capture the back side image 136 of the interaction request document (e.g., interaction request document 120A or 120B of FIG. 1). The back side image 136 is a color image having the format 138.

At operation 206, a processor 166 of an interceptor system 164 receives the front side image 134 and the back side image 136. In certain embodiments, the processor 166 of the interceptor system 164 receives the front side image 134 and the back side image 136 from an interaction processing system 150. In such embodiments, the user device 106 sends the front side image 134 and the back side image 136 to a mobile application server 140, which forwards the front side image 134 and the back side image 136 to the interaction processing system 150. At operation 208, the processor 166 of the interceptor system 164 sends the front side image 134 and the back side image 136 to a first image processing system 174A and a second image processing system 174B. In certain embodiments, the processor 166 of the interceptor system 164 sends the front side image 134 and the back side image 136 to the first image processing system 174A and the second image processing system 174B at the same time.

At operation 210, a processor 176A of the first image processing system 174A processes the front side image 134 and the back side image 136 to generate a first converted front side image 184A and a first converted back side image 186A, respectively. The first converted front side image 184A and the first converted back side image 186A are black and white images having a format 188A. In certain embodiments, the format 188A may be a 16-bit black and white tiff, or other image formats suitable for black and white images. At operation 212, a processor 176B of the second image processing system 174B processes the front side image 134 and the back side image 136 to generate a second converted front side image 184B and a second converted back side image 186B, respectively. The second converted front side image 184B and the second converted back side image 186B are black and white images having the format 188B. In certain embodiments, the format 188B may be a 16-bit black and white tiff, or other image formats suitable for black and white images.

At operation 214, the processor 176A of the first image processing system 174A determines whether the first converted front side image 184A and the first converted back side image 186A are successfully generated. In response to determining at operation 214 that the first converted front side image 184A and the first converted back side image 186A are not successfully generated, method 200 proceeds to operation 216. At operation 216, the processor 166 of the interceptor system 164 receives a notification 190A from the first image processing system 174A. The notification 190A indicates that processing of the front side image 134 and the back side image 136 failed.

At operation 218, the processor 176B of the second image processing system 174B determines whether the second converted front side image 184B and the second converted back side image 186B are successfully generated. In response to determining at operation 218 that the second converted front side image 184B and the second converted back side image 186B are not successfully generated, method 200 proceeds to operation 220. At operation 220, the processor 166 of the interceptor system 164 receives a notification 190B from the second image processing system 174B. The notification 190B indicates that processing of the front side image 134 and the back side image 136 failed.

At operation 222, the processor 166 of the interceptor system 164 sends the notification 190A or the notification 190B to the interaction processing system 150. At operation 224, a processor 152 of the interaction processing system 150 generates a notification 192. The notification 192 indicates that an interaction corresponding to the interaction request document (e.g., interaction request document 120A or 120B of FIG. 1) failed. At operation 226, the processor 152 of the interaction processing system 150 sends the notification 192 to the mobile application server 140, which forwards the notification 192 to the user device 106. After performing operation 226, method 200 proceeds to end.

In response to determining at operation 214 that the first converted front side image 184A and the first converted back side image 186A are successfully generated, method 200 proceeds to operation 228. At operation 228, the processor 176B of the second image processing system 174B determines whether the second converted front side image 184B and the second converted back side image 186B are successfully generated. In response to determining at operation 228 that the second converted front side image 184B and the second converted back side image 186B are not successfully generated, method 200 proceeds to operation 230. At operation 230, the processor 166 of the interceptor system 164 receives a notification 190B from the second image processing system 174B. The notification 190B indicates that processing of the front side image 134 and the back side image 136 failed.

At operation 232, the processor 166 of the interceptor system 164 receives the first converted front side image 184A and the first converted back side image 186A from the first image processing system 174A and sends the first converted front side image 184A and the first converted back side image 186A to the interaction processing system 150. At operation 234, the processor 152 of the interaction processing system 150 performs an interaction corresponding to the interaction request document (e.g., interaction request document 120A or 120B of FIG. 1) based on the first converted front side image 184A and the first converted back side image 186A. In certain embodiments, the processor 152 of the interaction processing system 150 extracts user information (e.g., user information 122A or 122B of FIG. 1), interaction requestor information (e.g., interaction requestor information 124A or 124B of FIG. 1), interaction information (e.g., interaction information 126A or 126B of FIG. 1), and interaction requestor account information (e.g., interaction requestor account information 128A or 128B of FIG. 1) from the first converted front side image 184A and the first converted back side image 186A. In certain embodiments when the interaction request document (e.g., interaction request document 120A or 120B of FIG. 1) is a check, the processor 152 of the interaction processing system 150 deposits requested funds to the user account number 130 of the user 104 from a requestor account number.

At operation 236, the processor 152 of the interaction processing system 150 generates a notification 192. The notification 192 indicates that the interaction corresponding to the interaction request document (e.g., interaction request document 120A or 120B of FIG. 1) succeeded. At operation 238, the processor 152 of the interaction processing system 150 sends the notification 192 to the mobile application server 140, which forwards the notification 192 to the user device 106. After performing operation 238, method 200 proceeds to end.

In response to determining at operation 218 that the second converted front side image 184B and the second converted back side image 186B are successfully generated, method 200 proceeds to operation 240. At operation 240, the processor 166 of the interceptor system 164 receives the second converted front side image 184B and the second converted back side image 186B from the second image processing system 174B and sends the second converted front side image 184B and the second converted back side image 186B to the interaction processing system 150. At operation 242, the processor 152 of the interaction processing system 150 performs an interaction corresponding to the interaction request document (e.g., interaction request document 120A or 120B of FIG. 1) based on the second converted front side image 184B and the second converted back side image 186B. In certain embodiments, the processor 152 of the interaction processing system 150 extracts user information (e.g., user information 122A or 122B of FIG. 1), interaction requestor information (e.g., interaction requestor information 124A or 124B of FIG. 1), interaction information (e.g., interaction information 126A or 126B of FIG. 1), and interaction requestor account information (e.g., interaction requestor account information 128A or 128B of FIG. 1) from the second converted front side image 184B and the second converted back side image 186B. In certain embodiments, when the interaction request document (e.g., interaction request document 120A or 120B of FIG. 1) is a check, the processor 152 of the interaction processing system 150 deposits requested funds to the user account number 130 of the user 104 from the requestor account number.

At operation 244, the processor 152 of the interaction processing system 150 generates a notification 192. The notification 192 indicates that the interaction corresponding to the interaction request document (e.g., interaction request document 120A or 120B of FIG. 1) succeeded. At operation 246, the processor 152 of the interaction processing system 150 sends the notification 192 to the mobile application server 140, which forwards the notification 192 to the user device 106. After performing operation 246, method 200 proceeds to end.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system comprising:

an interceptor system communicatively coupled to an interaction processing system, a first image processing system and a second image processing system, wherein:

the first image processing system is configured to process images of interaction request documents of a first type associated with a first geographical region;

the second image processing system is configured to process images of interaction request documents of a second type associated with a second geographical region different from the first geographical region;

the interceptor system is configured to transmit a first front side image and a first back side image of a first interaction request document to both the first image processing system and the second image processing system; and the interceptor system comprises a processor configured to:

receive the first front side image and the first back side image of the first interaction request document from a mobile application server, wherein:

the mobile application server receives the first interaction request document from a user device associated with a user;

the first front side image is a colored image with a first format;

the first interaction request document corresponds to a first interaction to be performed between the user and a first interaction requestor; and the first interaction request document is of the first type;

send the first front side image and the first back side image to the first image processing system for processing;

send the first front side image and the first back side image to the second image processing system for processing, wherein:

the first front side image and the first back side image are sent to the second image processing system simultaneously, with the sending of the first front side image and the first back side image to the first image processing system; and the first front side image and the first back side image are sent to both the first image processing system and the second image processing system, without first determining whether the first interaction request document is of the first type associated with a first geographical region or the second type associated with a second geographical region;

receive a first converted front side image and a first converted back side image from the first image processing system, wherein the first converted front side image is a black and white image with a second format, wherein the first format and the second format are different formats;

receive a first notification from the second image processing system, wherein the first notification indicates that the second image processing system failed to generate a second converted front side image of the first front side image and a second converted back side image of the first back side image; and send the first converted front side image and the first converted back side image to the mobile application server.

2. The system of claim 1, wherein the processor is further configured to:

receive a second front side image and a second back side image of a second interaction request document from the user device of the user, wherein:

the second interaction request document corresponds to a second interaction to be performed between the user and a second interaction requestor; and the second interaction request document is of the second type;

send the second front side image and the second back side image to the first image processing system and the second image processing system for processing;

receive a third converted front side image and a third converted back side image from the second image processing system;

receive a second notification from the first image processing system, wherein the second notification indicates that processing of the second front side image and the second back side image failed; and send the third converted front side image and the third converted back side image to the interaction processing system.

3. The system of claim 1, wherein the processor is further configured to:

receive a second front side image and a second back side image of a second interaction request document from the user device of the user, wherein:

the second interaction request document corresponds to a second interaction to be performed between the user and a second interaction requestor; and the second interaction request document is of the first type;

send the second front side image and the second back side image to the first image processing system and the second image processing system for processing;

receive a second notification from the first image processing system, wherein the second notification indicates that processing of the second front side image and the second back side image failed;

receive a third notification from the second image processing system, wherein the third notification indicates that processing of the second front side image and the second back side image failed; and send the second notification or the third notification to the interaction processing system.

4. The system of claim 1, wherein the processor is further configured to:

receive a second front side image and a second back side image of a second interaction request document from the user device of the user, wherein:

the second interaction request document corresponds to a second interaction to be performed between the user and a second interaction requestor; and the second interaction request document is of the second type; and send the second front side image and the second back side image to the first image processing system and the second image processing system for processing.

5. The system of claim 4, wherein the processor is further configured to:

receive a second notification from the first image processing system, wherein the second notification indicates that processing of the second front side image and the second back side image failed.

6. The system of claim 5, wherein the processor is further configured to:

receive a third notification from the second image processing system, wherein the third notification indicates that processing of the second front side image and the second back side image failed.

7. The system of claim 6, wherein the processor is further configured to:

send the second notification or the third notification to the interaction processing system.

8. A method comprising:

receiving a first front side image and a first back side image of a first interaction request document from a mobile application server, wherein:

the mobile application server receives the first interaction request document from a user device associated with a user;

the first front side image is a colored image with a first format;

the first interaction request document corresponds to a first interaction to be performed between the user and a first interaction requestor; and the first interaction request document is of a first type associated with a first geographical region;

sending the first front side image and the first back side image to a first image processing system for processing, wherein the first image processing system is configured to process images of interaction request documents of the first type associated with the first geographical region;

sending the first front side image and the first back side image to a second image processing system for processing, wherein:

the first front side image and the first back side image are sent to the second image processing system simultaneously, with the sending of the first front side image and the first back side image to the first image processing system;

the second image processing system is configured to process images of interaction request documents of a second type associated with a second geographical region different from the first geographical region; and the first front side image and the first back side image are sent to both the first image processing system and the second image processing system, without first determining whether the first interaction request document is of the first type associated with a first geographical region or a second type associated with a second geographical region;

receiving a first converted front side image and a first converted back side image from the first image processing system, wherein the first converted front side image is a black and white image with a second format, wherein the first format and the second format are different formats;

receiving a first notification from the second image processing system, wherein the first notification indicates that the second image processing system failed to generate a second converted front side image of the first front side image and a second converted back side image of the first back side image; and sending the first converted front side image and the first converted back side image to the mobile application server.

9. The method of claim 8, further comprising:

receiving a second front side image and a second back side image of a second interaction request document from the user device of the user, wherein:

the second interaction request document corresponds to a second interaction to be performed between the user and a second interaction requestor; and the second interaction request document is of a second type;

sending the second front side image and the second back side image to the first image processing system and the second image processing system for processing;

receiving a third converted front side image and a third converted back side image from the second image processing system; and receiving a second notification from the first image processing system, wherein the second notification indicates that processing of the second front side image and the second back side image failed.

10. The method of claim 9, further comprising:

sending the third converted front side image and the third converted back side image to an interaction processing system.

11. The method of claim 8, further comprising:

receiving a second front side image and a second back side image of a second interaction request document from the user device of the user, wherein:

the second interaction request document corresponds to a second interaction to be performed between the user and a second interaction requestor; and the second interaction request document is of the first type;

sending the second front side image and the second back side image to the first image processing system and the second image processing system for processing;

receiving a second notification from the first image processing system, wherein the second notification indicates that processing of the second front side image and the second back side image failed;

receiving a third notification from the second image processing system, wherein the third notification indicates that processing of the second front side image and the second back side image failed; and sending the second notification or the third notification to an interaction processing system.

12. The method of claim 8, further comprising:

receiving a second front side image and a second back side image of a second interaction request document from the user device of the user, wherein:

the second interaction request document corresponds to a second interaction to be performed between the user and a second interaction requestor; and the second interaction request document is of a second type;

sending the second front side image and the second back side image to the first image processing system and the second image processing system for processing; and receiving a second notification from the first image processing system, wherein the second notification indicates that processing of the second front side image and the second back side image failed.

13. The method of claim 12, further comprising:

receiving a third notification from the second image processing system, wherein the third notification indicates that processing of the second front side image and the second back side image failed.

14. The method of claim 13, further comprising:

sending the second notification or the third notification to an interaction processing system.

15. A non-transitory computer-readable medium storing instructions that, when executed by one or more processors, cause the one or more processors to:

receive a first front side image and a first back side image of a first interaction request document from a mobile application server, wherein:

the mobile application server receives the first interaction request document from a user device associated with a user;

the first front side image is a colored image with a first format;

the first interaction request document corresponds to a first interaction to be performed between the user and a first interaction requestor; and the first interaction request document is of a first type associated with a first geographical region;

send the first front side image and the first back side image to a first image processing system for processing, wherein the first image processing system is configured to process images of interaction request documents of the first type associated with the first geographical region;

send the first front side image and the first back side image to a second image processing system for processing, wherein:

the first front side image and the first back side image are sent to the second image processing system simultaneously, with the sending of the first front side image and the first back side image to the first image processing system;

the second image processing system is configured to process images of interaction request documents of a second type associated with a second geographical region different from the first geographical region; and the first front side image and the first back side image are sent to both the first image processing system and the second image processing system, without first determining whether the first interaction request document is of the first type associated with a first geographical region or a second type associated with a second geographical region;

receive a first converted front side image and a first converted back side image from the first image processing system, wherein the first converted front side image is a black and white image with a second format, wherein the first format and the second format are different formats;

receive a first notification from the second image processing system, wherein the first notification indicates that the second image processing system failed to generate a second converted front side image of the first front side image and a second converted back side image of the first back side image; and send the first converted front side image and the first converted back side image to the mobile application server.

16. The non-transitory computer-readable medium of claim 15, wherein the instructions, when executed by the one or more processors, further cause the one or more processors to:

receive a second front side image and a second back side image of a second interaction request document from the user device of the user, wherein:

the second interaction request document corresponds to a second interaction to be performed between the user and a second interaction requestor; and the second interaction request document is of a second type;

send the second front side image and the second back side image to the first image processing system and the second image processing system for processing;

receive a third converted front side image and a third converted back side image from the second image processing system; and receive a second notification from the first image processing system, wherein the second notification indicates that processing of the second front side image and the second back side image failed.

17. The non-transitory computer-readable medium of claim 15, wherein the instructions, when executed by the one or more processors, further cause the one or more processors to:

receive a second front side image and a second back side image of a second interaction request document from the user device of the user, wherein:

the second interaction request document corresponds to a second interaction to be performed between the user and a second interaction requestor; and the second interaction request document is of the first type;

send the second front side image and the second back side image to the first image processing system and the second image processing system for processing;

receive a second notification from the first image processing system, wherein the second notification indicates that processing of the second front side image and the second back side image failed;

receive a third notification from the second image processing system, wherein the third notification indicates that processing of the second front side image and the second back side image failed; and send the second notification or the third notification to an interaction processing system.

18. The non-transitory computer-readable medium of claim 15, wherein the instructions, when executed by the one or more processors, further cause the one or more processors to:

receive a second front side image and a second back side image of a second interaction request document from the user device of the user, wherein:

the second interaction request document corresponds to a second interaction to be performed between the user and a second interaction requestor; and the second interaction request document is of a second type;

send the second front side image and the second back side image to the first image processing system and the second image processing system for processing; and receive a second notification from the first image processing system, wherein the second notification indicates that processing of the second front side image and the second back side image failed.

19. The non-transitory computer-readable medium of claim 18, receive a third notification from the second image processing system, wherein the third notification indicates that processing of the second front side image and the second back side image failed.

20. The non-transitory computer-readable medium of claim 19, send the second notification or the third notification to an interaction processing system.

* * * * *